United States Patent
Raanani et al.

(10) Patent No.: US 9,635,178 B2
(45) Date of Patent: *Apr. 25, 2017

(54) COORDINATING VOICE CALLS BETWEEN REPRESENTATIVES AND CUSTOMERS TO INFLUENCE AN OUTCOME OF THE CALL

(71) Applicant: AffectLayer, Inc., San Francisco, CA (US)

(72) Inventors: Roy Raanani, Rheinfelden (CH); Russell Levy, Raanana (IL); Micha Yochanan Breakstone, Raanana (IL)

(73) Assignee: AffectLayer, Inc., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/168,729

(22) Filed: May 31, 2016

(65) Prior Publication Data
US 2016/0352907 A1    Dec. 1, 2016

Related U.S. Application Data

(60) Provisional application No. 62/169,445, filed on Jun. 1, 2015, provisional application No. 62/169,456, filed on Jun. 1, 2015.

(51) Int. Cl.
*H04M 3/00* (2006.01)
*H04M 5/00* (2006.01)
(Continued)

(52) U.S. Cl.
CPC ...... *H04M 3/5175* (2013.01); *G06F 17/2785* (2013.01); *G06F 17/289* (2013.01);
(Continued)

(58) Field of Classification Search
CPC .. G10L 15/00; G06Q 10/06; G06Q 10/06316; G06Q 30/016; H04L 51/02;
(Continued)

(56) References Cited

U.S. PATENT DOCUMENTS 7,023,979 B1 * 4/2006 Wu ................. H04M 3/5233
                                            379/265.11
7,487,094 B1 * 2/2009 Konig ................. G10L 15/19
                                            379/88.01
(Continued)

OTHER PUBLICATIONS

Co-Pending .U.S. Appl. No. 15/168,675 of Raanani, R., et al., filed May 31, 2016.

*Primary Examiner* — Khai N Nguyen
(74) *Attorney, Agent, or Firm* — Perkins Coie LLP (57) ABSTRACT

The disclosure is directed to analyzing voice conversations between participants of conversations and coordinating calls between participants, e.g., in order to influence an outcome of the voice conversation. For example, sales calls can be coordinated between specific sales representatives ("representatives") and customers by routing a sales call from a customer to a specific sales representative, based on their voices and the content of the conversation, with the goal of positively influencing the outcome of the sales call. A mapping between sales representatives and customers that is set to maximize the probability for certain outcomes is generated. This mapping (or pairing) may be fed into either an automatic or manual coordination system that connects or bridges sales representatives with customers. The mapping may be generated either based on historic data or early-call conversation analysis, in both inbound and outbound calls.

38 Claims, 7 Drawing Sheets

(51) Int. Cl.
  *H04M 3/51* (2006.01)
  *G10L 17/02* (2013.01)
  *G06N 99/00* (2010.01)
  *G06N 7/00* (2006.01)
  *G06F 17/27* (2006.01)
  *G06F 17/28* (2006.01)
  *H04M 3/523* (2006.01)
  *H04M 3/42* (2006.01)

(52) U.S. Cl.
  CPC ........... *G06N 7/005* (2013.01); *G06N 99/005* (2013.01); *G10L 17/02* (2013.01); *H04M 3/5232* (2013.01); *H04M 3/42221* (2013.01); *H04M 2201/40* (2013.01); *H04M 2203/357* (2013.01); *H04M 2203/556* (2013.01)

(58) Field of Classification Search
  CPC ...... H04L 51/046; H04L 51/24; H04M 3/323; H04M 3/36; H04M 3/4217; H04M 3/4285; H04M 3/42195; H04M 3/493; H04M 3/4931; H04M 3/4933; H04M 3/4935; H04M 3/4936; H04M 3/4938; H04M 3/42221; H04M 3/51; H04M 3/5166; H04M 3/5175; H04M 3/5183; H04M 3/5191; H04M 3/523; H04M 3/5231; H04M 3/5232; H04M 3/5233; H04M 3/5235; H04M 3/5237; H04M 3/5238; H04M 3/54; H04M 2203/40; H04M 2203/401; H04M 2203/2011; H04M 2203/2061; H04M 2242/00; H04M 2242/08; H04M 2242/12
  USPC ............ 379/210.01, 265.01, 265.02, 265.03, 379/265.04, 265.05, 265.06, 265.07, 379/265.08, 265.09, 265.1, 265.11, 379/265.12, 265.13, 265.14, 266.01, 379/266.02, 266.03, 266.04, 266.05, 379/266.06, 266.07, 266.08, 266.09, 379/266.1
  See application file for complete search history.

(56) References Cited

U.S. PATENT DOCUMENTS

| | | | | |
|---|---|---|---|---|
| 8,914,285 B2* | 12/2014 | Wasserblat | .............. | G10L 25/51 704/238 |
| 2007/0038499 A1* | 2/2007 | Margulies | .............. | G06Q 10/06 705/7.26 |
| 2009/0222313 A1* | 9/2009 | Kannan | .................. | G06Q 30/02 705/7.31 |
| 2012/0072254 A1* | 3/2012 | McLean | ................ | G06Q 10/063 705/7.14 |
| 2014/0025376 A1* | 1/2014 | Wasserblat | .............. | G10L 25/51 704/238 |
| 2014/0086402 A1* | 3/2014 | Kan | .................... | H04M 3/5232 379/265.06 |
| 2014/0270133 A1* | 9/2014 | Conway | .............. | H04M 3/5233 379/265.1 |
| 2015/0201077 A1* | 7/2015 | Konig | ................. | H04M 3/5175 379/265.07 |
| 2015/0237213 A1* | 8/2015 | Chishti | ............... | H04M 3/5236 379/265.14 |
| 2015/0242860 A1* | 8/2015 | Kannan | .................. | G06Q 30/02 705/304 |
| 2015/0254675 A1* | 9/2015 | Kannan | ................ | G06Q 30/016 705/304 |
| 2015/0348570 A1* | 12/2015 | Feast | ................... | H04M 3/5175 704/270 |

* cited by examiner

COORDINATING VOICE CALLS BETWEEN REPRESENTATIVES AND CUSTOMERS TO INFLUENCE AN OUTCOME OF THE CALL

CROSS-REFERENCE TO RELATED APPLICATION(S)

This application claims the benefit of U.S. Provisional Application Ser. No. 62/169,445 titled "COORDINATING VOICE CALLS BETWEEN SALES REPRESENTATIVES AND CUSTOMERS TO INFLUENCE AN OUTCOME OF THE CALL" filed Jun. 1, 2015, and U.S. Provisional Application Ser. No. 62/169,456 titled "MODELING VOICE CALLS TO IMPROVE AN OUTCOME OF A CALL BETWEEN A SALES REPRESENTATIVE AND A CUSTOMER" filed Jun. 1, 2015, both of which are incorporated herein by reference for all purposes in their entirety.

BACKGROUND

A growing body of academic research points to a significant correlation between the outcome of voice conversations and the compatibility, similarity, and social identification of the participating voices.[i] With over 2.4 million non-retail inside sales representatives in the United States (U.S.) alone, millions of sales phone conversations are made on a daily basis,[ii] yet only rudimentary automated coordination of sales representatives with customers is performed. For example, current call coordination technologies that coordinate calls between sales representatives and customers are typically based on representatives' experience and perceived complexity of the customer's case, or based on a geographical location of a customer and sales representatives. This is mainly due to the fact that sales conversations are left largely unanalyzed in any automatic way, rendering their content inaccessible to modeling, and precluding the ability to insightfully coordinate customers with specific representatives.

[i]Ibister, Lifelike Computer Character Conference, 1995; Tusing and Dillard, Human Communication Research 26, 2000; Nass and Brave, Wired for Speech, 2007
[ii]Insidesales.com "Market size 2013" study Recent advances in "automatic speech recognition" (ASR) technologies, and specifically in "large vocabulary continuous speech recognition" (LVCSR), are for the first time enabling high-accuracy automatic transcription of conversations. At the same time, natural language processing (NLP) approaches to both topic modeling and world-knowledge modeling, have become much more efficient due to the availability of large, freely accessible natural language corpora (e.g., CommonCrawl), as well as freely available ontologies or "knowledge graphs" (e.g., DBpedia). Finally, recent research on affect identification applying machine learning (ML) has been able to successfully model subjective aspects of emotion and personality traits as perceived by listeners. However, the current call coordination technologies fail to exploit these technologies for efficient coordination of calls between sales representatives and customers.

DETAILED DESCRIPTION

Embodiments are disclosed for a call-coordination system for analyzing conversations, e.g., voice conversations, between participants of the conversations and coordinating calls between the participants, e.g., in order to influence an outcome of the conversation. One such embodiment can coordinate both outbound and inbound calls between specific sales representatives and customers, based on characteristics of the conversation, e.g., voice of the representatives and/or the customers, and content of the conversation, with the goal of positively influencing the outcome of the call. The embodiments generate a mapping between representatives and customers that is set to maximize the probability for certain outcomes. This mapping (or pairing) may be fed into either an automatic or manual coordination system that connects or bridges sales representatives with customers. The mapping may be generated either based on historic data or early-call conversation analysis, in both inbound and outbound calls. Note the calls can be coordinated between any two participants. While a participant at one end of the call does not change or cannot be selected, e.g., a customer, a participant at the other end of the call, e.g., a representative, can change when the disclosed techniques are applied to the call. Note that, for the sake of convenience, an entity which cannot change is referred to as a "customer" and an entity which can change is referred to as a "representative"; however, the entities are not limited to the above specified roles.

The call-coordination system can include (i) an offline analysis component; and (ii) a real-time analysis component. The offline analysis component can take as input conversations between the participants, e.g., audio recordings of calls between the participants and process the recordings of both the participants using multiple distinct components and generate features of the conversations. The features can include transcripts of audio recordings, vocabulary, semantic information of conversations, summarizations of utterances and various natural language entailments, voice signal associated features (e.g., a speech rate, a speech volume, a tone, and a timber), emotions (e.g., fear, anger, happiness, timidity, fatigue), personality traits (e.g., trustworthiness, engagement, likeability, dominance, etc.) and personal attributes (e.g., an age, an accent, and a gender).

In some embodiments, the audio recordings can be tagged with various tags, e.g., a tag that indicates a trait (e.g., "extrovert", "trustworthy voice", "anxious", etc.) of one or more of the participants, a tag that indicates a call outcome (e.g., "sales closed", "sales failed", "follow-up call scheduled") and/or a tag that indicates "key moments" of a conversation. A "key moment" or a "moment" can be a specific event or an occurrence of a specified characteristic in the call. The moment can be any event or occurrence that is of specific interest for a specified application for which the call-coordination system is being implemented. An administrator of the call-coordination system can configure what events and/or occurrences in a call have to be identified as a moment. For example, a moment can include laughter, engagement, fast-talking, open-ended questions, objections, etc. in a conversation. The tags can be generated automatically by the call-coordination system, manually, e.g., by human judgment, or both. In some embodiments, the tags are generated automatically by the call-coordination system. The tag can include various details, e.g., information regarding a moment, a time interval at which the moment occurred in the call, duration for which the moment lasted, information regarding the participants of the call, etc.

The moments can also be notified to and/or shared between the participants, e.g., during an on-going conversation and/or after the conversation. For example, during a call between a user and a representative, the call-coordination system can analyze the call, identify the moments in the conversation, and tag, notify and/or share the moments with the representative's manager, peers or other people. The shared moments can be used for various purposes, e.g., for coaching the representatives in handling the calls to improve outcomes of the calls based on various situations. The moments can be shared using various means, e.g., via email, a chat application, or a file sharing application.

The offline analysis component can analyze the features further to generate one or more classifiers that indicate conversation outcomes, e.g., "sales closed", "sales failed." Each of the classifiers indicate a specific outcome and can include a set of features that contributed to the specific outcome. The offline analysis component can generate multiple classifiers for the same outcome, however, the multiple classifiers can have distinct sets of features. In some embodiments, the offline analysis component can analyze the features using a machine learning algorithm (e.g., a linear classifier, such as a support vector machine (SVM), or a non-linear algorithm, such as a deep neural network (DNN) or one of its variants) to generate the classifiers.

The real-time analysis component uses the classifiers to generate a mapping that coordinates calls between representatives and customers for both inbound and outbound calls. The real time analysis component receives real-time call data of an ongoing conversation between the customer and a first representative and analyzes the real-time call data to generate a set of features, e.g., as described above. The real-time analysis component can then find a set of classifiers indicating a specified outcome and that includes features matching the set of features. The real-time analysis component can then choose one of the set of classifiers, e.g., using the classifier's prediction power, which can be indicated using a probability value for the specified outcome, as a specified classifier. After determining the specified classifier, the real-time analysis module can choose a representative from a group of representatives who have characteristics that match one or more features of the specified classifier, and route the call to the selected representative. The real-time analysis component can route the calls based on early-stage call information and/or historic information for the representative and/or customers to maximize success probability based on learned models. The call-coordination system produces real-time matching and coordination of representatives with customers to positively influence the outcome of the conversations.

Figure 1:
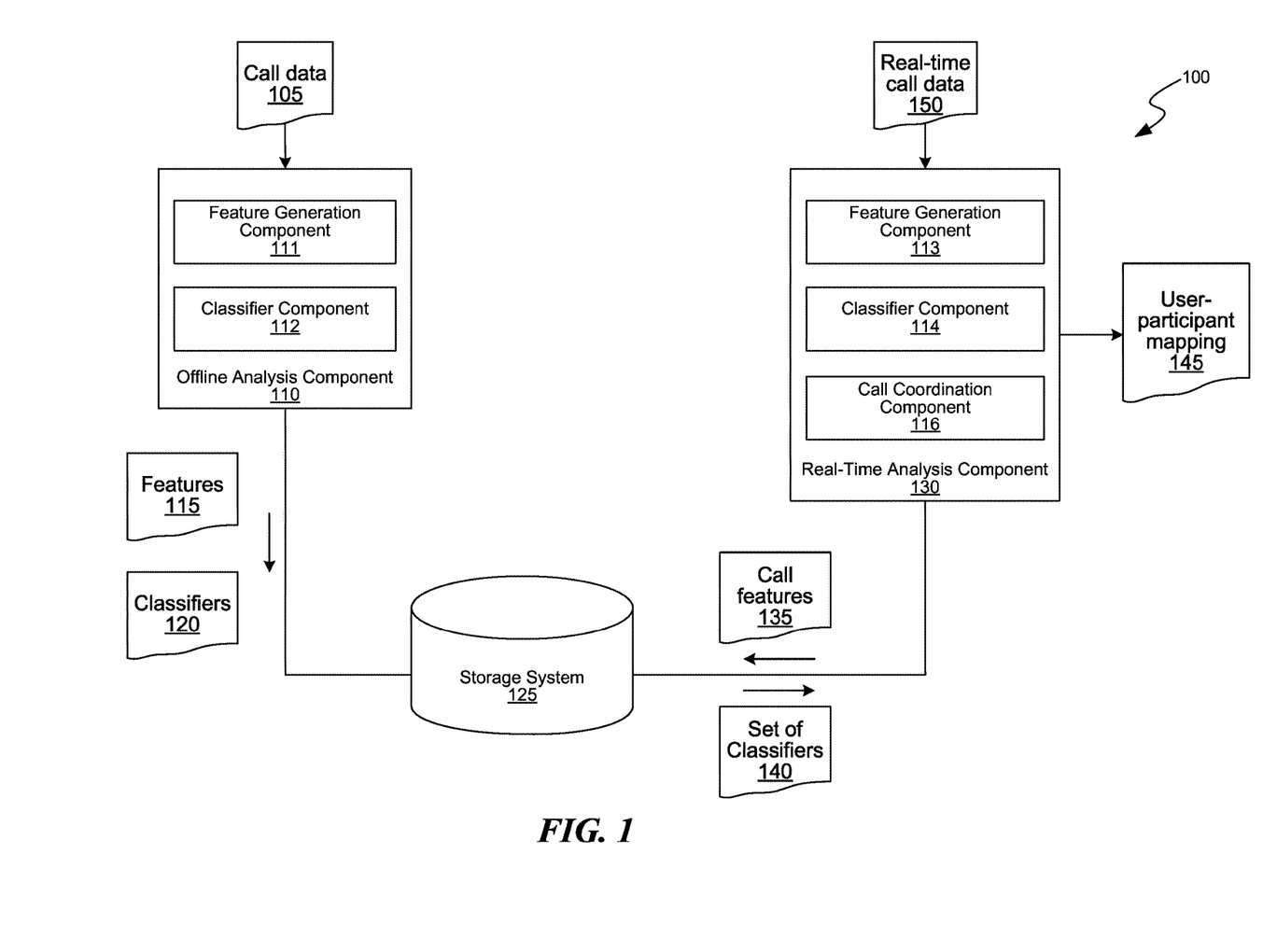
FIG. 1 is a block diagram of a call co-ordination system in which the disclosed embodiments can be implemented.

Turning now to FIG. 1, FIG. 1 is a block diagram of a call co-ordination system 100 in which the disclosed embodiments can be implemented. The call co-ordination system 100 includes an offline analysis component 110 and a real-time analysis component 130. The offline analysis component 110 can take as input call data 105, which includes conversations between participants, e.g., audio recordings of calls between the participants, and process the call data 105 using multiple components to generate features 115 of the conversations and classifiers 120.

The offline analysis component 110 includes a feature generation component 111 that generates the features 115 by analyzing the call data 105 using various techniques, e.g., automatic speech recognition (ASR), natural language processing (NLP). The features 115 can include transcripts of audio recordings, vocabulary, semantic information of conversations, summarizations of utterances and various natural language entailments, voice signal associated features (e.g., a speech rate, a speech volume, a tone, and a timber), emotions (e.g., fear, anger, happiness, timidity, fatigue), personality traits (e.g., trustworthiness, engagement, likeability, dominance, etc.) and personal attributes (e.g., an age, an accent, and a gender).

The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "probability to recommend to a friend," "a measure of customer satisfaction," "Net promoter score (NPS)." The outcomes can have binary values, e.g., "yes/no," "high/low," or non-binary values, e.g., a probability score, enumerated values like "low, average, medium, high, very high," values in a scale of 0-10, etc. For example, an outcome such as customer satisfaction can be measure using binary values such as "low/high," or using non-binary values, such as a scale of 0-10, enumerated values. Each of the classifiers indicates a specific outcome and can include a set of the features that contributed to the specific outcome. For example, a classifier "C1" can indicate that for men calling in for the first time, there is a 30% higher probability of scheduling a preliminary examination when either a representative who delivered a clear company value proposition, a man of any age or a woman over 50 answers as the representative and if the representative indulged in rapport building, in contrast, for women calling in, a preliminary examination has 40% more chances of being scheduled if the representative is a young extrovert woman and has a high degree of engagement. The features of the classifier "C1" can be "f1->customer gender=male" "f2->customer calling first time=yes," "f3->representative delivered company value proposition=yes," ("f4->representative gender =male," "f5->representative age=any age,") or ("f4->representative gender =female," "f5->representative age=over 50 years,"), "f6->representative rapport building =yes," and "outcome=schedule preliminary examination with an increased probability of 30%." The features of the classifier "C2" can be "f1->customer gender =female" "f2->customer calling first time=yes," "f3->representative delivered company value proposition=yes," "f4->representative gender =female," "f5->representative age=<30 years," "f6->representative-characteristic =extrovert," "f7->representative-wow metric =high" and "outcome=schedule preliminary examination with an increased probability of 40%." Some of the classifiers include inter-speaker features that indicate a specific relation/comparison between the speakers that contribute to a specified outcome. For example, similarity of speech rate between the representative and the user, extrovert/introvert matching, or gender or age agreement.

Note that the features are just attributes, i.e., without values, such as "gender," "age" etc., and the classifier determines what values of the features influence a particular outcome of the call. The classifiers 120 can be generated in various formats and is not limited to the above illustrated example format. The classifier component 112 can generate multiple classifiers for the same outcome, however, the multiple classifiers can have distinct sets of features. The offline analysis component 110 can store the features 115 and the classifiers 120 in a storage system 125.

Further, the classifier component 112 generates different classifiers for different time windows or time intervals in the conversations. That is, a classifier can correspond to a particular time window of the conversation. For example, the classifying component 112 can analyze the features at various time windows, e.g., seconds 00:05-00:10, seconds 00:20-00:30, minutes 1:00-2:00 of the conversation, etc., and generate one or more classifiers for each time window. Further, the time window can be of varying or fixed-length.

The call co-ordination system 100 includes a real-time analysis component 130 that uses the classifiers 120 to generate a mapping 145 for coordinating calls between the representatives and the customers, e.g., for both inbound and outbound calls. The real-time analysis component 130 receives real-time call data 150 of an ongoing conversation between a customer and a first representative and analyzes the real-time call data 150 to generate a set of features, e.g., call features 135, for the ongoing conversation using a feature generation component 113. In some embodiments, the feature generation component 113 is similar to or same as the feature generation component 111. The feature generation component 113 generates the call features 135 based on the real-time call data 150, e.g., as described above with respect to the feature generation component 111. The real-time call data 150 can be an early-stage or initial conversation between the customer and the first representative. After the call features 135 are generated, a classifier component 114 determines a set of classifiers 140 that includes features matching the call features 135 and for a specified outcome of the call. For example, if the desired outcome of the call is to close the sales, then the classifier component 114 searches for classifiers that are generated for an outcome of "sales closed" and having features that match with one or more of the call features 135. The classifier component 114 can then choose one of the set of classifiers 140, e.g., using the classifier's prediction power, which can be indicated using a probability value for the specified outcome, as a specified classifier. In some embodiments, the classifier component 114 is the same as, or similar to the classifier component 112. After determining the specified classifier, a call coordination component 116 can generate a mapping 145 between the customer and a specified representative from a group of representatives who have characteristics that match with one or more features of the specified classifier, and route the call to the specified representative. The mapping 145 can include information regarding mappings between various customers and representatives, or between various customer personalities to representative personalities.

The call co-ordination system 100 can store information regarding various characteristics of the representatives in the storage system 125. The call coordination component 116 can search the storage system 125 to find representatives that have specific characteristics, e.g., that match with one or more of the features in the specified classifier.

The call data 105 can be in various formats, e.g., audio recordings, transcripts of audio recordings, online chat conversations. Similarly, the real-time call data 150 can be in various formats, e.g., real-time audio stream of the call, a chat transcript of an ongoing conversation in an online chat application. Further, the real-time call data 150, which can be the initial or the early stage conversation, can be a conversation between the customer and an automated machine, e.g., interactive voice response (IVR) system or a random representative who gathers preliminary information from the customer that can be useful for routing the call to the appropriate representative.

In some embodiments, the call co-ordination system 100 includes a search tool that facilitates a user to explore various aspects of a conversation. For example, the search tool allows the user to search for anything that came up on the call, e.g., both linguistic and meta-linguistic. The search tool can be used to further analyze the conversation, extract appropriate features and use them to further improve the classifiers in predicting the outcome of the calls.

Figure 2:
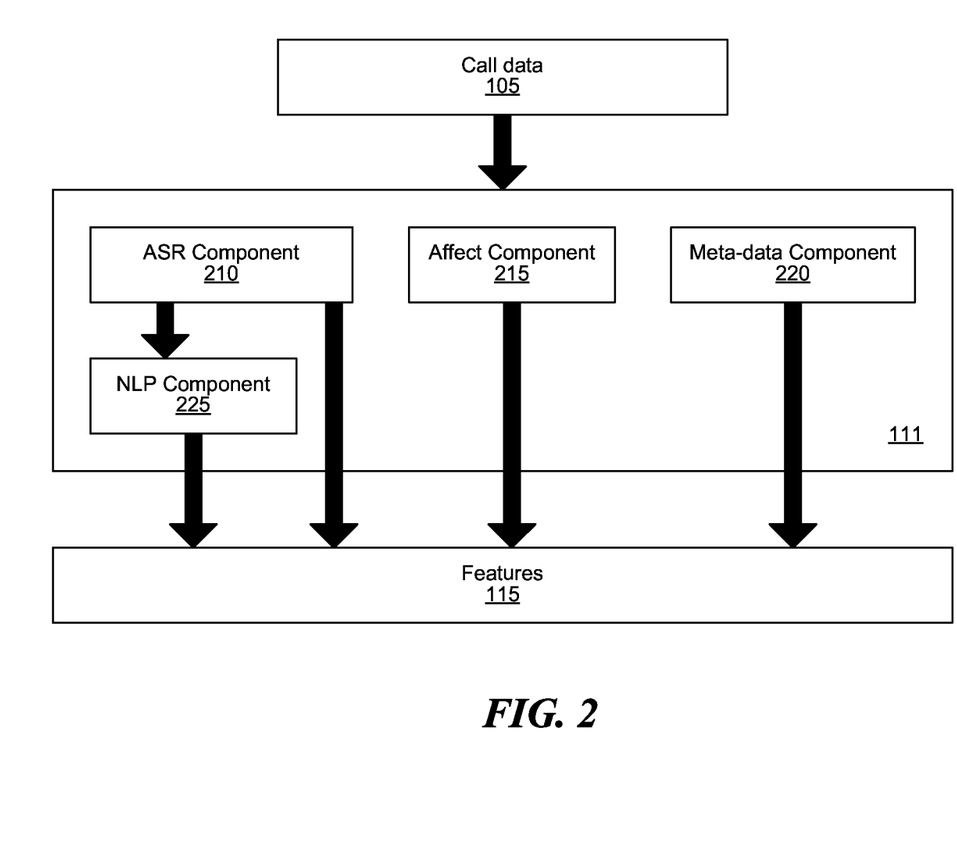
FIG. 2 is a block diagram of a feature generation component of FIG. 1 for extracting features from call data, consistent with various embodiments.

FIG. 2 is a block diagram of a feature generation component of FIG. 1 for extracting features from call data, consistent with various embodiments. In some embodiments, the feature generation component 111 includes an ASR component 210, an NLP component 225, an affect component 215 and a metadata component 220. The ASR component 210 can analyze call data 205, e.g., a voice recording, and produce a transcription, vocabulary, and a language model of the conversation. The NLP component 225 can extract semantic information, such as key objection handling responses, from the output of the ASR component 210. The affect component 215 can analyze the call data 205 for emotional signals and personality traits (e.g., likeability, extroversion/introversion, and trustworthiness) as well as general personal attributes such as gender, age, and accent of the participants. The metadata component 220 can extract data regarding conversation flow (e.g., who spoke when, and how much silence and overlap occurred). In some embodiments, the above components can process the call data 105 in parallel. The output of the components can be generated as features 115 of the conversations, which can be analyzed to determine outcomes of the conversations.

The ASR component 210 may be tuned for specific applications, e.g., for sales calls. The features produced by the ASR component 210 may include full transcripts, vocabularies, statistical language models (e.g., transition probabilities), histograms of word occurrences ("bag of words"), weighted histograms (where words are weighted according to their contextual salience, using e.g., a Term Frequency—Inverse Document Frequency (TF-IDF) scheme), n-best results, or any other data available from the component's lattice, such as phoneme time-stamps, etc. The ASR component 210 may also be used to extract meta-linguistic features such as laughter, hesitation, gasping, background noise, etc. The ASR features can be extracted separately for the representative and the customer, and may be recorded separately for multiple speakers on each side of the conversation.

The NLP component 225 processes the text to produce various semantic features, e.g., identification of topics, identification of open-ended questions, identification of objections and their correlation with specific questions, named entity recognition (NER), identification of relations between entities, identification of competitors and/or products, identification of key phrases and keywords (either predetermined, or identified using a salience heuristics such as TF-IDF), etc. Additional features that may be extracted by the NLP component 225 can be summarizations of utterances and various natural language entailments. The NLP features can be extracted separately for the representative and the customer, and may be recorded separately for multiple speakers on each side of the conversation.

The affect component 215 can extract low-level features and high-level features. The low-level features can refer to the voice signal itself and can include features such as a speech rate, a speech volume, a tone, a timber, a range of pitch, as well as any statistical data over such features (e.g., a maximal speech rate, a mean volume, a duration of speech over given pitch, a standard deviation of pitch range, etc.). The high-level features can refer to learned abstractions and can include identified emotions (e.g., fear, anger, happiness, timidity, fatigue, etc.) as well as perceived personality traits (e.g., trustworthiness, engagement, likeability, dominance, etc.) and perceived or absolute personal attributes such as an age, an accent, and a gender. Emotion identification, personality trait identification, and personal attributes, may be trained independently to produce models incorporated by the affect component, or trained using the human judgment tags optionally provided to the offline analysis component. In some embodiments, the affect component 215 can also extract features, such as a speaker engagement metric ("wow" metric), which measures how engaged a participant was in the conversation, e.g., based on the usage of vocabulary, rate of speech, pitch change. For example, the usage of phrase "Oh! cool" can indicate a higher degree of engagement than the phrase "cool!". In another example, the same phrase but said in different pitches or pitch ranges can indicate different degrees of engagement. All features extracted by the affect component 215 may or may not include a corresponding confidence level which can be used in modeling outcomes. The affect features can be extracted separately for the representative and the customer, and may be recorded separately for multiple speakers on each side of the conversation.

The metadata component 220 can measure conversation flow, including speaker diarisation (e.g., which speaker spoke when and for how long), silence times and duration, as well as overlap of two or more speakers in addition to other metadata such as time of day call was placed, geographical destination of call and known gender and age of participants. The data extracted with the metadata component 220 may be collected separately for multiple speakers on each side of the conversation, or pooled together for representative and customer sides, respectively.

All components may extract features for a group of representatives, a single representative and/or a customer, including multiple parties on either side, and may be customized to optimize feature extraction accordingly. In addition, the features 115 may be extracted on the representative's recording alone, on the customer's recording alone, or on both. The features 115 may also include comparisons between extracted attributes. For example, the affect component 215 may extract as a feature a mean difference between representative and customer's speech rates, or a maximum difference between representative and customer's speech pitches. Likewise, the ASR component 210 may extract transcriptions and keywords both as a combined transcript and as two separate transcripts, and may be tuned with an acoustic or language model specific to a group of representatives or an individual representative. Similarly, the NLP component 225 may extract features such as open-ended questions with or without the corresponding response.

In some embodiments, the feature generation component 111 can also generate a set of features that indicate a blueprint of a conversation. The blueprint can represent a skeleton of the conversation and indicate a presence or absence of a particular aspect in the conversation. For example, the blueprint can include various features that indicate whether the conversation included any agenda setting, rapport building, clarification questions, defining goals, setting expectations, mentioning of examples. The blueprint can also help in predictive analysis of the outcome of the calls, e.g., by the classifier component 112.

Figure 3:
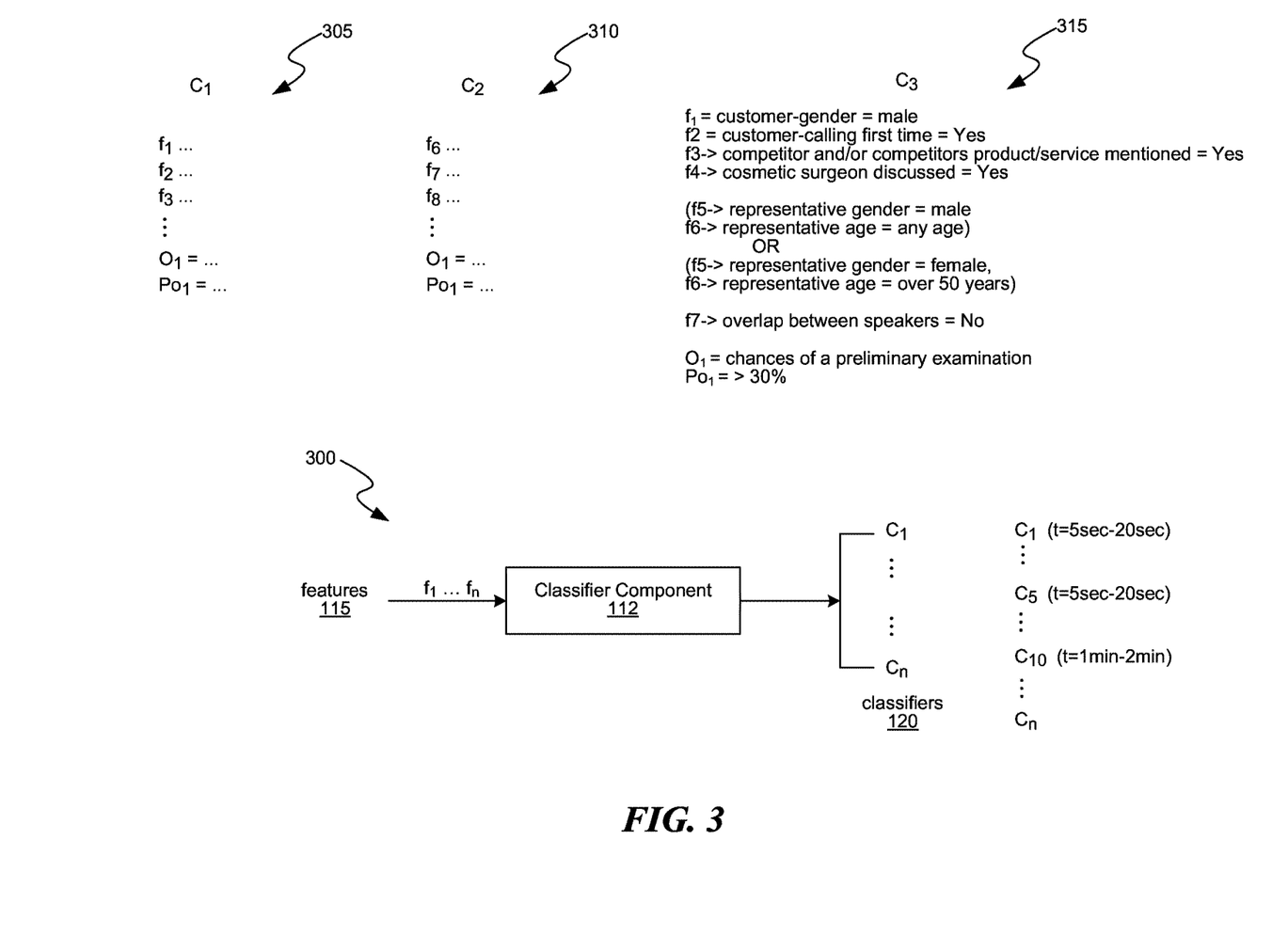
FIG. 3 is a block diagram of the classifier component for generating classifiers, consistent with various embodiments.

FIG. 3 is a block diagram of the classifier component for generating classifiers, consistent with various embodiments. The example 300 illustrates the classifier component 112 using the features 115 extracted from the feature generation component 111 to build a number of classifiers, "C1"-"CN." In some embodiments, the classifier component 112 is run on a dedicated portion of the collected recordings, e.g., a training set, which is a subset of the entire recordings available for analysis, to model the conversation outcomes. The conversation outcome can be any configurable outcome, e.g., "sales closed", "sales failed", "demo scheduled", "follow up requested." In some embodiments, the features 115 extracted from the feature generation component 111 can be fed into a machine learning algorithm (e.g., a linear classifier, such as a SVM, or a non-linear algorithm, such as a DNN or one of its variants) to produce the classifiers 120. The classifiers may be further analyzed to determine what features carry the largest predictive powers (e.g., similarity of speech rate, occurrence of first interrupt by customer, extrovert/introvert matching, or gender or age agreement.) The classifier component 112 can generate multiple classifiers for the same outcome. However, for a given outcome, different classifiers can have different features. For example, a first classifier 305, "C1," for a specified outcome, "o1," has a first set of features, e.g., features "f1"-"f3," and a second classifier 310, "C2" for the same outcome "o1" has a second set of features, e.g., features "f5"-"f8." The features in different classifiers can have different weight and contribute to the specified outcome in different degrees. Each of the classifiers can have a value, e.g., a probability value, that indicates a predictive power of the classifier for the specified outcome. Higher the predictive power, the higher the probability of achieving the specified outcome of the classifier. Different classifiers may be built for different number of participants, and may consider multiple participants as a single interlocutor, or as distinct entities.

The classifier 315, "C3," includes features extracted from analyzing various sales calls. The classifier 315 indicates that for men calling in for the first time at a cosmetic surgery institution, there is a 30% higher probability of scheduling a preliminary examination when a competitor and or competitor products are mentioned, a specific cosmetic surgeon is discussed, there is no speech overlap between speakers, and either a man of any age or a woman over 50 answers as the representative. The features of the classifier 315 "C3" can be "f1->customer gender=male" "f2->customer calling first time=yes," "f3->competitor and/or competitors product/service mentioned =yes," "f4->cosmetic surgeon discussed =yes," ("f5->representative gender =male," "f6->representative age=any age,") or ("f5->representative gender =female," "f6->representative age=over 50 years,") "f7->overlap of speakers =No" and "outcome=schedule preliminary examination with an increased probability of 30%."

As described above, each of the classifiers can correspond to a particular time window of a conversation(s). In the example 300, classifiers $C_1$ and $C_5$ correspond to a time window of seconds 00:05-00:20 of the conversations analyzed, and classifiers $C_{10}$ corresponds to minute 1:00-2:00 of the conversations.

Figure 4:
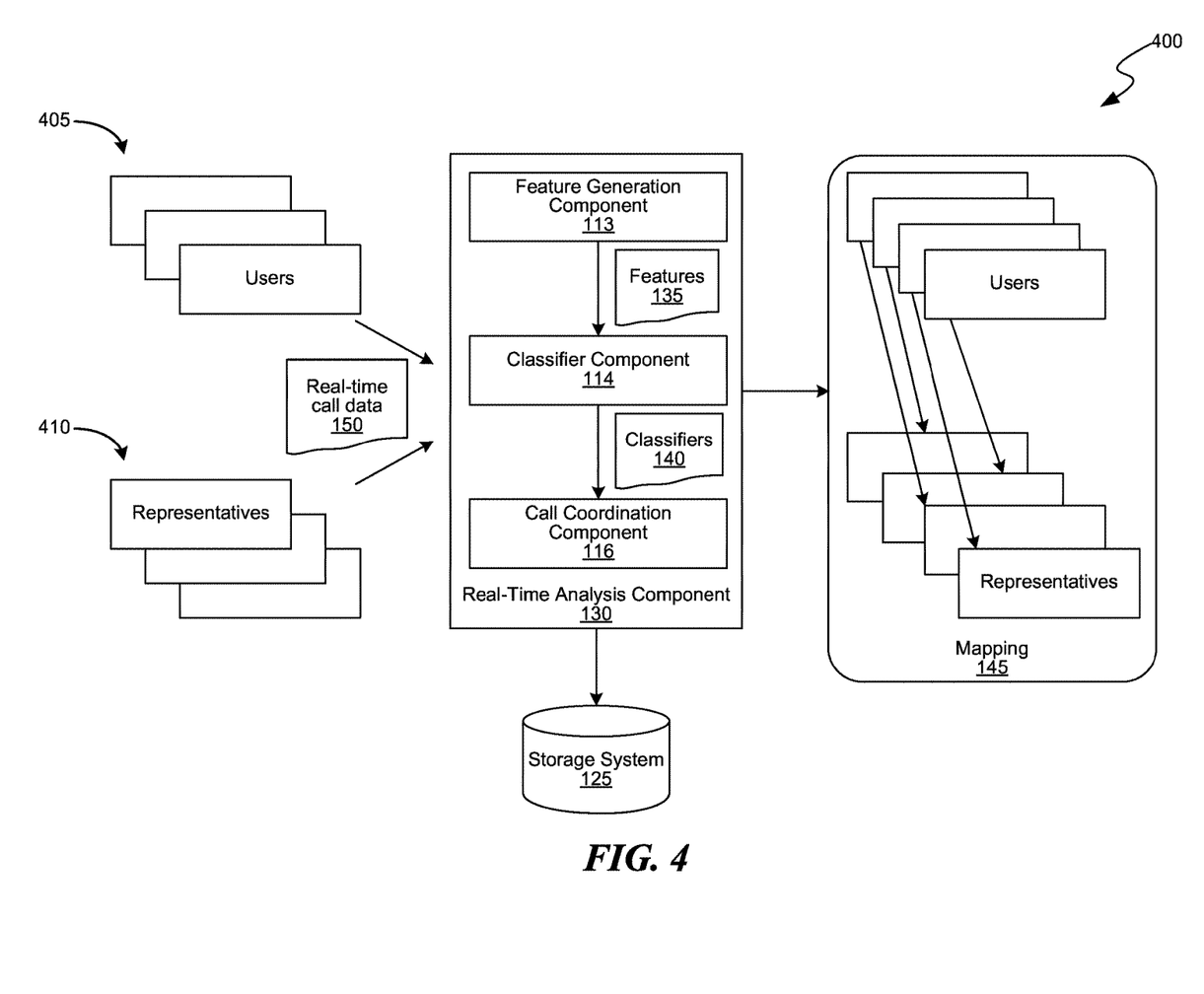
FIG. 4 is a block diagram of the real-time analysis component of FIG. 1 to generate a mapping that coordinates calls between various representatives and customers, consistent with various embodiments

The classifiers can be used by the real-time analysis component 130, e.g., as described at least with reference to FIG. 1 and FIG. 4 below, to generate a mapping that coordinates calls between representatives and customers in both inbound and outbound calls. FIG. 4 is a block diagram of the real-time analysis component of FIG. 1 to generate a mapping that coordinates calls between various representatives 410 and customers 405, consistent with various embodiments. In some embodiments, the real-time analysis component 130 takes as input a live conversation stream, e.g., real-time call data 150, between a representative and a customer, uses the feature generation component 113 to extract call features 135, e.g., as described above at least with reference to FIGS. 1 and 3. The classifier component 114 feeds them into the classifiers 120 generated by the offline analysis component 110 and selects a subset of the classifiers 120, e.g., a set of classifiers 140, that includes features that match with the call features 135 extracted from the live conversation stream.

This set of classifiers 140 then emits real-time probabilities for specific outcomes. The call coordination component 116 then chooses one of the set of classifiers 140, e.g., a specified classifier that has the highest probability value for a desired outcome of the call, and maps to one of a group of representatives who have characteristics that match with the features of the specified classifier. In some embodiments, the representative may be selected randomly from the matching group. In some embodiments, each of the representatives can be assigned a score based on the match with the features of the specified classifier and a representative with the highest match score is selected. In some embodiments, a representative who has the least number of calls in a call queue is selected from the group. The call co-ordination system 100 can store the characteristics of the representatives 410 in the storage system 125, which can be used by the call coordination component 116 for matching with the features of the specified classifier. The characteristics of the representatives 410 can be determined automatically, e.g., by the feature generation component 111, or can be input to the call co-ordination system 100 manually.

The call coordination component 116 can generate a mapping between the customer and the selected representative, and then route the call to the selected representative. The real-time analysis component 130 can create an optimal mapping 145 between the various representatives 410 and customers 405. The mapping 145 may optimize for a maximal mean probability of success or for a maximal probability of close for specific calls, as well as any other measure of success (e.g., largest predicted revenue). The call features 135 can be collected in real-time for both inbound and outbound calls. Whenever historic data for a specific person or group of people is available, it may be used to update the mapping 145 by feeding this data through the classifier. Additionally, features collected early in the conversation, e.g., real-time call data, may be used to remap and redirect specific representatives to customers. Multiple classifiers representing different ways of pooling multiple representatives 410 and customers 405 may be used to create maximal probability mappings.

Additionally, the mapping 145 may be used for guiding representatives with respective customers. For example, if the classifier has learned that a specific representative and customer would lead, e.g., with high probability, to success if the representative kept their speech rate below five words/second, asked open-ended questions, resolved objections raised by the customer, it may be used to inform the representative and/or their managers to adjust their speech rate, ask open-ended questions, and/or address the objections accordingly. On the other hand, if, for example, the classifier has learned that a conversation between an introverted man over age 50 and an extroverted 20 year old woman leads to low closing rates, it may signal the representative and/or their managers to expedite wrap-up of such conversations and/or later remap them, to avoid losing time on a call that will not yield desired results.

In addition to mapping the customers to representatives in real-time, the real-time analysis component 130 may be used to provide representatives and sales managers with insight into how to better adapt to specific customers, providing them with quantifiable training for future calls. The real-time analysis component 130 may also be used to auto-populate information fields in a Customer Relationship Management (CRM) or similar system with the features extracted in real-time.

Figure 5:
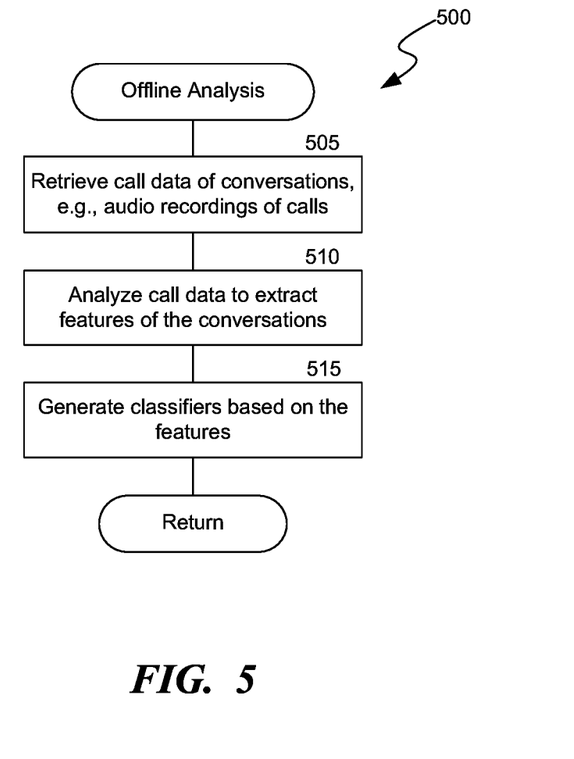
FIG. 5 is a flow diagram of a process for performing offline analysis of conversations between participants, consistent with various embodiments.

FIG. 5 is a flow diagram of a process 500 for performing offline analysis of conversations between participants, consistent with various embodiments. In some embodiments, the process 500 can be implemented in the call co-ordination system 100 of FIG. 1. At block 505, the offline analysis component 110 retrieves call data, e.g., call data 105, regarding various conversations between participants, such as a customer and a representative. In some embodiments, the call data 105 can be audio recordings of calls between the participants, transcripts of audio recordings, chat transcripts, etc. The offline analysis component 110 can retrieve the call data 105 from the storage system 125. Further, in some embodiments, the call data 105 can include data regarding only a subset of the conversations stored in the storage system 125.

At block 510, the feature generation component 111 analyzes the call data 105 to extract various features of the conversation, e.g., as described at least with reference to FIGS. 1 and 2. Some example features include transcripts of audio recordings, vocabulary, semantic information of conversations, summarizations of utterances and various natural language entailments, voice signal associated features (e.g., a speech rate, a speech volume, a tone, and a timber), emotions (e.g., fear, anger, happiness, timidity, fatigue), inter-speaker features (e.g., similarity of speech rate between speakers, occurrence of first interrupt by customer, extrovert/introvert matching, or gender or age agreement), personality traits (e.g., trustworthiness, engagement, likeability, dominance, etc.) and personal attributes (e.g., an age, an accent, and a gender).

At block 515, the classifier component 112 analyzes the features to generate classifiers, e.g., as described at least with reference to FIGS. 1 and 3. The classifier component 112 analyzes the features 115 using various techniques, e.g., machine learning algorithms such as SVM, DNN, to generate the classifiers 120. The classifiers 120 indicate conversation outcomes, e.g., "sales closed", "sales failed," "likely to recommend to a friend." Each of the classifiers indicates a specific outcome and can include a set of the features that contributed to the specific outcome. For example, a classifier "C1" can indicate that for men calling in for the first time, there is a 30% higher probability of scheduling a preliminary examination when either a man of any age or a woman over 50 answers as the representative. The classifier component 112 can generate multiple classifiers for the same outcome, however, the multiple classifiers can have distinct sets of features. The offline analysis component 110 can store the features 115 and the classifiers 120 in a storage system 125.

Figure 6:
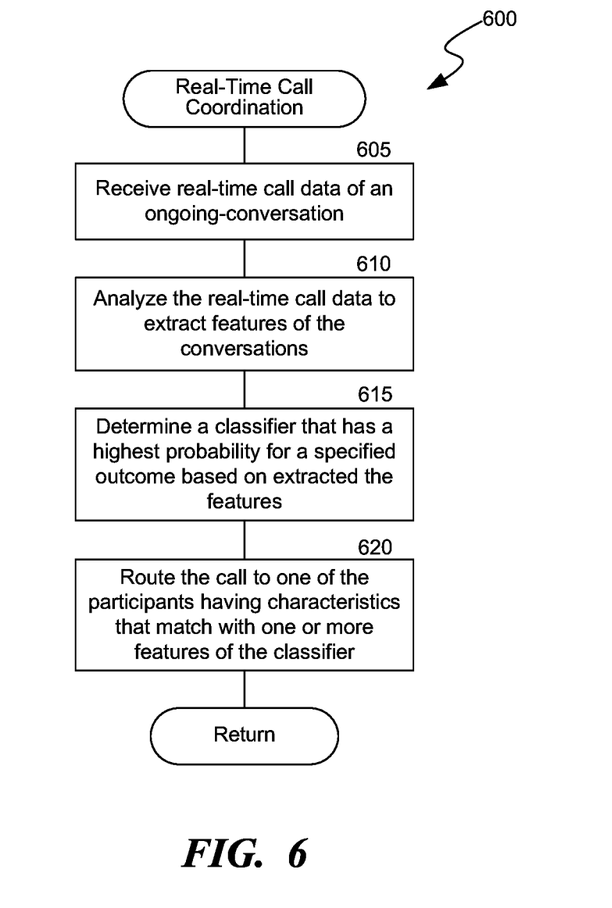
FIG. 6 is a flow diagram of a process for coordinating calls between participants, consistent with various embodiments.

FIG. 6 is a flow diagram of a process 600 for coordinating calls between participants, consistent with various embodiments. In some embodiments, the process 600 can be implemented in the call co-ordination system 100 of FIG. 1. At block 605, the real-time analysis component 130 receives real-time call data 150 of an ongoing conversation, e.g., an audio stream of a voice call between a customer and a representative. At block 610, the feature generation component 113 analyzes the real-time call data 150 to extract features, e.g., call features 135, of the ongoing conversation, e.g., as described at least with reference to FIGS. 1 and 2.

At block 615, the classifier component 114 determines a classifier that has a highest probability for a desired outcome based on the extracted features, e.g., as described at least with reference to FIGS. 1 and 4. For example, the classifier component 114 feeds the extracted features into the classifiers 120 generated by the offline analysis component 110, and selects a subset of the classifiers 120, e.g., a set of classifiers 140, that includes features that match with the call features 135 extracted from the live conversation stream. The set of classifiers 140 then emits real-time probabilities for specific outcomes. The call coordination component 116 then chooses one of the set of classifiers 140, e.g., a specified classifier that has the highest probability value for a desired outcome of the call.

At block 620, the call coordination component 116 maps the call to one of a group of representatives who have characteristics that match with the features of the specified classifier. The call co-ordination system 100 can store the characteristics of the representatives 410 in the storage system 125, which can be used by the call coordination component 116 for matching with the features of the specified classifier. The call coordination component 116 can generate a mapping between the customer and the selected representative, and then route the call to the selected representative.

Example Usage of the Embodiments

The following is an example usage of the disclosed embodiments for coordinating calls between representatives and customers at a sales call center of a cosmetic surgery institution. At a first stage, e.g., before a call is received from a customer or before a call is placed by a representative, a number of audio recordings of previous calls is processed by the offline analysis component 110, e.g., using an ASR component 210 that is customized for the field of surgery institutions, an NLP component 225, an affect component 215 and a metadata component 220. The classifier component 112 generates a classifier revealing that for men calling in for the first time, there is a 30% higher probability of scheduling a preliminary examination when a competitor and or competitor products are mentioned, a specific cosmetic surgeon is discussed, there is no overlap between speakers, the representative exhibits a high degree of engagement and keeps his speech rate below a specified threshold, e.g., below that of the customer, and either a man of any age or a woman over 50 answers as the representative, in contrast, for women calling in, a preliminary examination has 40% more chances of being scheduled if the representative is a young extrovert woman. This classifier is then used by the real-time analysis component 130 to map between women calling in, to younger extrovert women and mapping men calling in to either older women or men.

To accomplish the mapping, at a first stage, e.g., when a call is received at a call center from a customer and during the call, a neutral representative and/or an IVR is used to quickly solicit audio and extract vocal features from the customer, and then the call is directed to the one of the representatives with the highest likelihood of closing the sales call, e.g., having the customer schedule a preliminary examination as specified above. Additionally, the staff for the sales call center can be crafted to reflect in composition the relative population size of men vs. women calling the center.

The embodiments disclosed above may be implemented as separate modules, e.g., as presented above, as a single module, or any combination thereof. Implementation details may vary, including machine learning algorithms employed. The embodiments may be implemented using any software development environment or computer language. The embodiments may be provided as a packaged software product, a web-service, an API or any other means of software service. The embodiments may use expert taggers, crowdsourcing or a hybrid approach for tagging.

Figure 7:
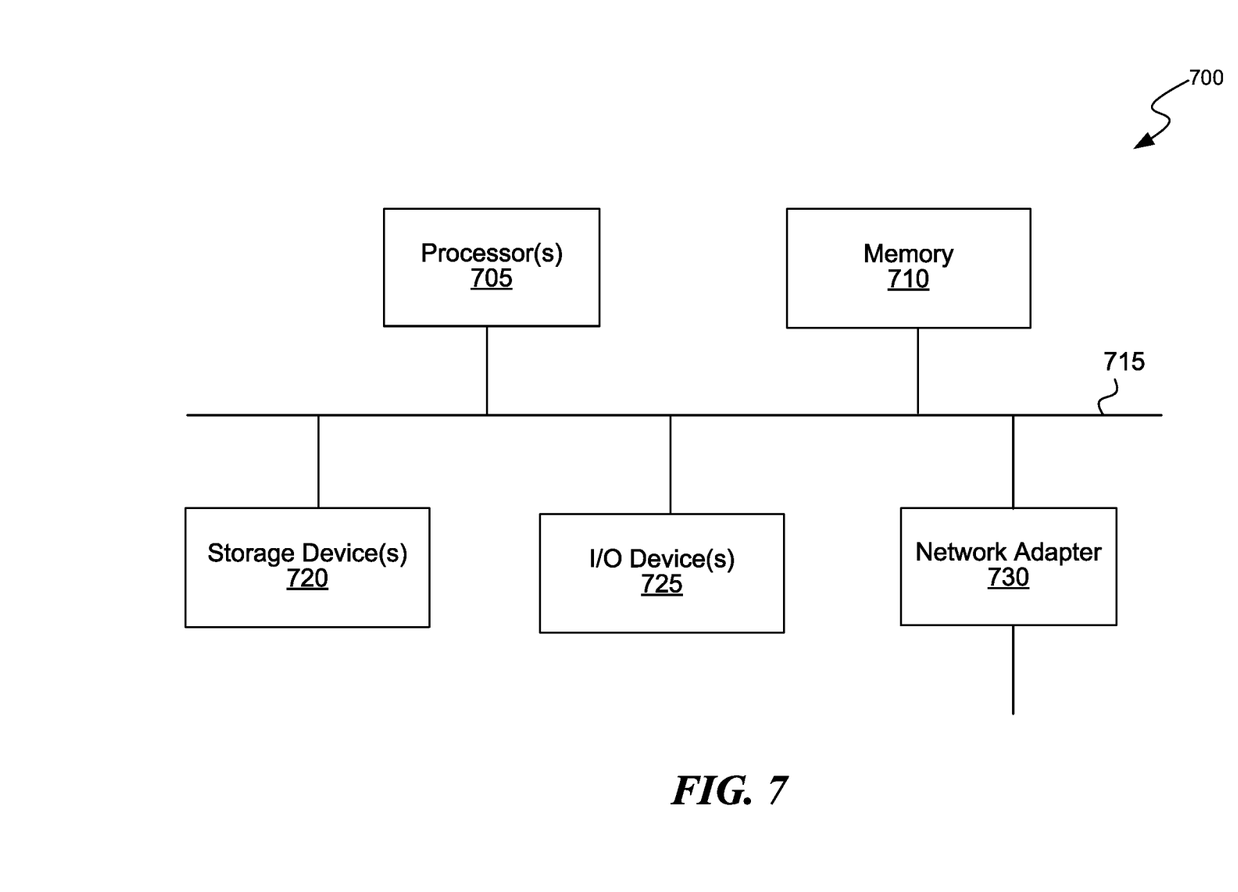
FIG. 7 is a block diagram of a processing system that can implement operations of the disclosed embodiments.

FIG. 7 is a block diagram of a computer system as may be used to implement features of the disclosed embodiments. The computing system 700 may be used to implement any of the entities, components or services depicted in the examples of the foregoing figures (and any other components described in this specification). The computing system 700 may include one or more central processing units ("processors") 705, memory 710, input/output devices 725 (e.g., keyboard and pointing devices, display devices), storage devices 720 (e.g., disk drives), and network adapters 730 (e.g., network interfaces) that are connected to an interconnect 715. The interconnect 715 is illustrated as an abstraction that represents any one or more separate physical buses, point to point connections, or both connected by appropriate bridges, adapters, or controllers. The interconnect 715, therefore, may include, for example, a system bus, a Peripheral Component Interconnect (PCI) bus or PCI-Express bus, a HyperTransport or industry standard architecture (ISA) bus, a small computer system interface (SCSI) bus, a universal serial bus (USB), IIC (I2C) bus, or an Institute of Electrical and Electronics Components (IEEE) standard 1394 bus, also called "Firewire".

The memory 710 and storage devices 720 are computer-readable storage media that may store instructions that implement at least portions of the described embodiments. In addition, the data structures and message structures may be stored or transmitted via a data transmission medium, such as a signal on a communications link. Various communications links may be used, such as the Internet, a local area network, a wide area network, or a point-to-point dial-up connection. Thus, computer readable media can include computer-readable storage media (e.g., "non-transitory" media) and computer-readable transmission media.

The instructions stored in memory 710 can be implemented as software and/or firmware to program the processor(s) 705 to carry out actions described above. In some embodiments, such software or firmware may be initially provided to the processing system 700 by downloading it from a remote system through the computing system 700 (e.g., via network adapter 730).

The embodiments introduced herein can be implemented by, for example, programmable circuitry (e.g., one or more microprocessors) programmed with software and/or firmware, or entirely in special-purpose hardwired (non-programmable) circuitry, or in a combination of such forms. Special-purpose hardwired circuitry may be in the form of, for example, one or more ASICs, PLDs, FPGAs, etc.

Remarks

The above description and drawings are illustrative and are not to be construed as limiting. Numerous specific details are described to provide a thorough understanding of the disclosure. However, in some instances, well-known details are not described in order to avoid obscuring the description. Further, various modifications may be made without deviating from the scope of the embodiments. Accordingly, the embodiments are not limited except as by the appended claims.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Terms that are used to describe the disclosure are discussed below, or elsewhere in the specification, to provide additional guidance to the practitioner regarding the description of the disclosure. For convenience, some terms may be highlighted, for example using italics and/or quotation marks. The use of highlighting has no influence on the scope and meaning of a term; the scope and meaning of a term is the same, in the same context, whether or not it is highlighted. It will be appreciated that the same thing can be said in more than one way. One will recognize that "memory" is one form of a "storage" and that the terms may on occasion be used interchangeably.

Consequently, alternative language and synonyms may be used for any one or more of the terms discussed herein, nor is any special significance to be placed upon whether or not a term is elaborated or discussed herein. Synonyms for some terms are provided. A recital of one or more synonyms does not exclude the use of other synonyms. The use of examples anywhere in this specification including examples of any term discussed herein is illustrative only, and is not intended to further limit the scope and meaning of the disclosure or of any exemplified term. Likewise, the disclosure is not limited to various embodiments given in this specification.

Those skilled in the art will appreciate that the logic illustrated in each of the flow diagrams discussed above, may be altered in various ways. For example, the order of the logic may be rearranged, substeps may be performed in parallel, illustrated logic may be omitted; other logic may be included, etc.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

We claim:

1. A computer-implemented method for determining a specified participant of multiple participants to whom a call from a user is to be routed, the computer-implemented method comprising:

analyzing, by a computer system, a set of call data between multiple users and the multiple participants to extract multiple features of conversations between the users and the participants, the multiple features indicating characteristics of any of (a) at least one of the users, (b) at least one of the participants, (c) the conversations;

extracting, by the computer system, the multiple features of the conversations;

generating, by the computer system, multiple classifiers based on the multiple features, wherein each of the multiple classifiers indicates one of multiple outcomes of a conversation and includes a subset of the multiple features that contributed to the one of the multiple outcomes, wherein different classifiers have distinct features, wherein at least one of the multiple features in each of the multiple classifiers indicates a characteristic of the multiple participants that influenced an outcome of the conversation indicated by the corresponding classifier;

receiving, by the computer system, real-time call data of the call between the user and a first participant of the multiple participants;

extracting, by the computer system, a set of features from the real-time call data;

determining, by the computer system and for a specified outcome of the multiple outcomes, a specified classifier of the multiple classifiers that matches with the set of features; and routing, by the computer system, the call to the specified participant of the multiple participants whose characteristics matches with one or more features in the specified classifier.

2. The computer-implemented method of claim 1, wherein analyzing the set of call data includes analyzing audio recordings of conversations between the multiple users and the multiple callers.

3. The computer-implemented method of claim 1, wherein extracting the multiple features includes extracting the multiple features using an artificial intelligence technique or a machine learning technique.

4. The computer-implemented method of claim 1, wherein extracting the multiple features includes extracting the multiple features using natural language processing technique.

5. The computer-implemented method of claim 1, wherein generating the multiple classifiers includes generating the multiple classifiers using artificial intelligence or machine learning technique.

6. The computer-implemented method of claim 1, wherein routing the call to the specified participant includes:

determining a subset of the multiple classifiers that matches with the set of features, selecting one of the subset of the multiple classifiers as the specified classifier, selecting a subset of the multiple participants having characteristics that matches with one or more features in the specified classifier, and selecting one of the subset of the multiple participants as the specified participant to whom the call is to be routed.

7. The computer-implemented method of claim 6, wherein determining the subset of the multiple classifiers includes determining some of the multiple classifiers that have features associated with users matching with the set of features.

8. The computer-implemented method of claim 6, wherein selecting one of the subset of the multiple classifiers includes:
determining, from the subset of the multiple classifiers, one of the subset of the multiple classifiers that has features with highest predictive power for the specified outcome.

9. The computer-implemented method of claim 6, wherein each of the subset of the multiple classifiers includes different probabilities for different outcomes.

10. The computer-implemented method of claim 9, wherein selecting one of the subset of the multiple classifiers includes:
determining, from the subset of the multiple classifiers, the one of the subset of the multiple classifiers that has a highest probability for the specified outcome.

11. The computer-implemented method of claim 1, wherein extracting the multiple features includes:
generating, by the computer system, features that include a transcription, vocabulary and a language model of the conversations as a first output.

12. The computer-implemented method of claim 11, wherein extracting the multiple features includes:
generating, by the computer system and using the first output, features that include semantic information from the conversations.

13. The computer-implemented method of claim 1, wherein extracting the multiple features includes:
generating, by the computer system, a set of low-level features that indicate information associated with voice signal in the set of call data, and a set of high level features that include personality traits and personal attributes of the multiple participants and emotion data that indicates emotions of the multiple participants.

14. The computer-implemented method of claim 1, wherein extracting the multiple features includes:
generating, by the computer system, features that include data regarding conversation flow.

15. The computer-implemented method of claim 1, wherein extracting the multiple features includes:
generating, by the computer system, user-participant pair related features.

16. The computer-implemented method of claim 1, wherein extracting the multiple features includes:
generating, by the computer system, features that indicate a blueprint of a conversation between a specified user and one of the multiple participants in the conversation.

17. The computer-implemented method of claim 1, wherein extracting the multiple features includes:
generating, by the computer system, a speaker engagement metric that includes information regarding a degree of engagement of a specified user in a conversation.

18. The computer-implemented method of claim 1, wherein extracting the set of features from the real-time call data includes:
automatically generating, by the computer system, multiple tags for the call between the user and the first participant, wherein each of the multiple tags indicates a key moment of the call between the user and the first participant.

19. The computer-implemented method of claim 18, wherein each of the multiple tags includes at least one of information regarding a moment to which the tag corresponds, a time interval at which the moment occurred in the call between the user and the first participant, a duration for which the moment lasted, or information regarding the participants of the call between the user and the first participant.

20. The computer-implemented method of claim 18 further comprising:
sharing, by the computer system, the multiple tags with the multiple participants during the call between the user and the first participant.

21. A non-transitory computer-readable storage medium storing computer-readable instructions, comprising:
instructions for receiving real-time call data of a call between a user and a first participant of multiple participants;
instructions for extracting (a) a set of features from the real time call data, wherein the set of features includes characteristics of the user and characteristics associated with a conversation of the call, and (b) multiple features of conversations based on a set of call data between users and the multiple participants, the multiple features indicating characteristics of any of (a) at least one of the users, (b) at least one of the participants, (c) the conversations;
instructions for determining, for a specified outcome of multiple outcomes of the call, a specified classifier of multiple classifiers having features that matches with the set of features, wherein each of the multiple classifiers indicates one of multiple outcomes of the conversation and includes a probability value for the corresponding outcome; and
instructions for generating a mapping between the user and a subset of multiple participants that match with features of the specified classifier.

22. The non-transitory computer-readable storage medium of claim 21 further comprising:
instructions for routing the call from the user to one of the multiple participants in the mapping.

23. The non-transitory computer-readable storage medium of claim 21, wherein the instructions for determining the specified classifier include:
instructions for generating the multiple classifiers based on the multiple features, wherein at least one of the multiple features in each of the multiple classifiers indicates a characteristic of the multiple participants that influenced an outcome of conversations indicated by the corresponding classifier.

24. The non-transitory computer-readable storage medium of claim 23, wherein the instructions for generating the multiple classifiers include:
instructions for generating different classifiers for different participants.

25. The non-transitory computer-readable storage medium of claim 23, wherein the instructions for generating the multiple classifiers include:
instructions for generating different classifiers for the same outcome, wherein the different classifiers have distinct features, and wherein a probability value of the outcome is based on a specified set of features in a specified classifier of the different classifiers.

26. The non-transitory computer-readable storage medium of claim 21, wherein the instructions for generating the mapping include:

instructions for retrieving, from a storage system, the subset of the participants whose user attributes including information regarding characteristics of the participants matches with the set of features.

27. A system for determining a first participant of multiple participants to whom a call from a user is to be routed, the system comprising:
a first component that is configured to receive real-time call data of the call between the user and a first participant of multiple participants;
a second component that is configured to extract a set of features from the real time call data, wherein the set of features includes characteristics of the user and characteristics associated with a conversation of the call;
a third component that is configured to determine, for a specified outcome of multiple outcomes of the call, a specified classifier of multiple classifiers having features that matches with the set of features, wherein each of the multiple classifiers indicates one of multiple outcomes of the conversation and includes a subset of the multiple features that contributed to the one of the multiple outcomes; and
a fourth component that is configured to generate a mapping between the user and a subset of the multiple participants that match with features of the specified classifier.

28. The system of claim 27 further comprising:
a fifth component that is configured to route the call from the user to one of the multiple participants in the mapping.

29. The system of claim 27, wherein the third component is further configured to:
analyze a set of call data between multiple users and the multiple participants to extract the multiple features of conversations between the users and the participants,
extract the multiple features of the conversations, and
generate the multiple classifiers based on the multiple features, wherein different classifiers have distinct features, wherein at least one of the multiple features in each of the multiple classifiers indicates a characteristic of the multiple participants that influenced an outcome of conversations indicated by the corresponding classifier.

30. The system of claim 29 further comprising:
a sixth component that is configured to generate features that include a transcription, vocabulary and a language model of the conversations as a first output.

31. The system of claim 30 further comprising:
a seventh component to generate, using the first output, features that include semantic information from the conversations.

32. The system of claim 29 further comprising:
an eight component that is configured to generate a set of low-level features that indicate information associated with voice signal in the set of call data, and a set of high level features that include personality traits and personal attributes of the multiple participants and emotion data that indicates emotions of the multiple participants.

33. The system of claim 27 further comprising:
a ninth component that is configured to facilitate searching call data of multiple conversations between multiple users and the multiple participants for linguistic and meta-linguistic information.

34. A system for analyzing and coordinating calls between customer representatives and customers in real time, comprising:
a first component that is configured to receive audio recordings and/or call streams and to receive a call from a customer of the customers;
a second component that is configured to extract features from the audio recordings and/or the call streams;
a third component that is configured to generate multiple classifiers based on the extracted features, the classifiers including probability values for multiple outcomes of the conversations; and
a fourth component that is configured to generate, in real-time, a mapping between one of the customer representatives and the customer based on one or more of the classifiers to maximize an outcome of the call between the customer and the one of the customer representatives.

35. The system of claim 34, wherein the second component is configured to extract the features using an automatic speech recognition component, a natural language processing component, an affect component and a meta-data component.

36. The system of claim 34, wherein the third component is configured to generate the classifiers for multiple persons on each side of the conversation.

37. The system of claim 34, wherein the third component is configured to generate the classifiers unsupervised, and without any tagged outcomes of the calls in the audio recordings and/or call streams.

38. The system of claim 34, wherein the third component is configured to apply deep learning techniques to generate the classifiers.

* * * * *